(12) United States Patent
Chary

(10) Patent No.: US 7,725,094 B2
(45) Date of Patent: May 25, 2010

(54) POWER PRIORITIZATION AMONG FUNCTIONS OF A MULTI-FUNCTION DEVICE

(75) Inventor: Ram V. Chary, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 11/171,691

(22) Filed: Jun. 29, 2005

(65) Prior Publication Data

US 2007/0004467 A1 Jan. 4, 2007

(51) Int. Cl.
*H04B 1/16* (2006.01)

(52) U.S. Cl. .............. 455/343.5; 455/572; 455/574; 455/343.2

(58) Field of Classification Search .......... 455/574, 455/571, 572, 573, 556.1, 556.2, 127.5, 343.1, 455/343.2, 343.5, 343.6
See application file for complete search history.

(56) References Cited

U.S. PATENT DOCUMENTS

| 6,668,179 | B2 * | 12/2003 | Jiang | 455/572 |
| 6,710,578 | B1 * | 3/2004 | Sklovsky | 320/127 |
| 2005/0048960 | A1 * | 3/2005 | Yamauchi et al. | 455/418 |
| 2005/0085277 | A1 * | 4/2005 | Chen et al. | 455/572 |
| 2005/0119028 | A1 * | 6/2005 | Paasovaara | 455/558 |
| 2006/0121954 | A1 * | 6/2006 | Mock | 455/574 |

* cited by examiner

*Primary Examiner*—Edward Urban
*Assistant Examiner*—Christian A Hannon
(74) *Attorney, Agent, or Firm*—Robert A. Diehl

(57) ABSTRACT

A device can provide a first function and a second function. The first function can have a higher priority for power than the second function. An input element can receive an indication of a remaining capacity of a power source for the device. A comparison element can compare the indication of the remaining capacity of the power source to a power threshold associated with the second function. A control element can initiate a power control action with respect to the second function if the indication of the remaining capacity of the power source is below the power threshold.

14 Claims, 6 Drawing Sheets

POWER PRIORITIZATION AMONG FUNCTIONS OF A MULTI-FUNCTION DEVICE

FIELD OF THE INVENTION

The present invention relates to the field of power management. More specifically, the present invention relates to prioritizing available power among functions in a multi-function device.

BACKGROUND

People commonly carry with them a variety of electronic devices, such as cellular phones, personal data assistants (PDA), notebook computers, digital cameras, global position system (GPS) devices, gaming devices like Game Boys and Playstation Portables, audio devices like MP3 players and iPods, and wireless email devices like Blackberries. The current trend is to converge functions like these into fewer devices that are more convenient for users. For example, cellular phones often include a digital camera function, and Blackberries often include a PDA function or a cell phone function. Notebook computers and handheld computers will soon be able to converge any of these functions and countless others.

Different devices can have very different power characteristics. For instance, a user may expect a fully charged battery to provide 4 to 6 hours of active operation in a handheld computer, 10 hours of active talk time and more than 250 hours of standby time in a cell phone, or 20 to 30 high resolution pictures in a digital camera. Ideally, when functions are converged into a single device, the device would meet the user's expectations for each function. Unfortunately, the power characteristics tend to change drastically with each added function.

For instance, in a cell phone with a high resolution digital camera function, a user may consume several minutes worth of talk time and many hours worth of standby time with each picture. After taking a few pictures, a user may be dismayed to discover that their battery is dead and no more calls can be made. Similarly, in a handheld computer with a cell phone function, the cell phone function may be rendered useless in as little as four hours by running a power hungry software application. In a handheld computer with a cell phone and a digital camera, the power characteristics become even more complicated, making the user's expectations for any one function even more difficult to meet.

One potential solution would be to use a larger battery that can provide enough power capacity to meet the user's expectations for each of the functions. Another potential solution would be to add separate batteries for each function, with each battery able to meet a user's expectation for each of the functions. Batteries, however, already account for a substantial portion of the size and shape of many devices. And, one of the most appealing aspects of converging functions is that multiple devices can be replaced with one device of about the same size and shape of a single device. So, for a multi-function device to be successful in the market place, any significant increase in battery size, or number of batteries, is likely to be out of the question.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Figure 1:
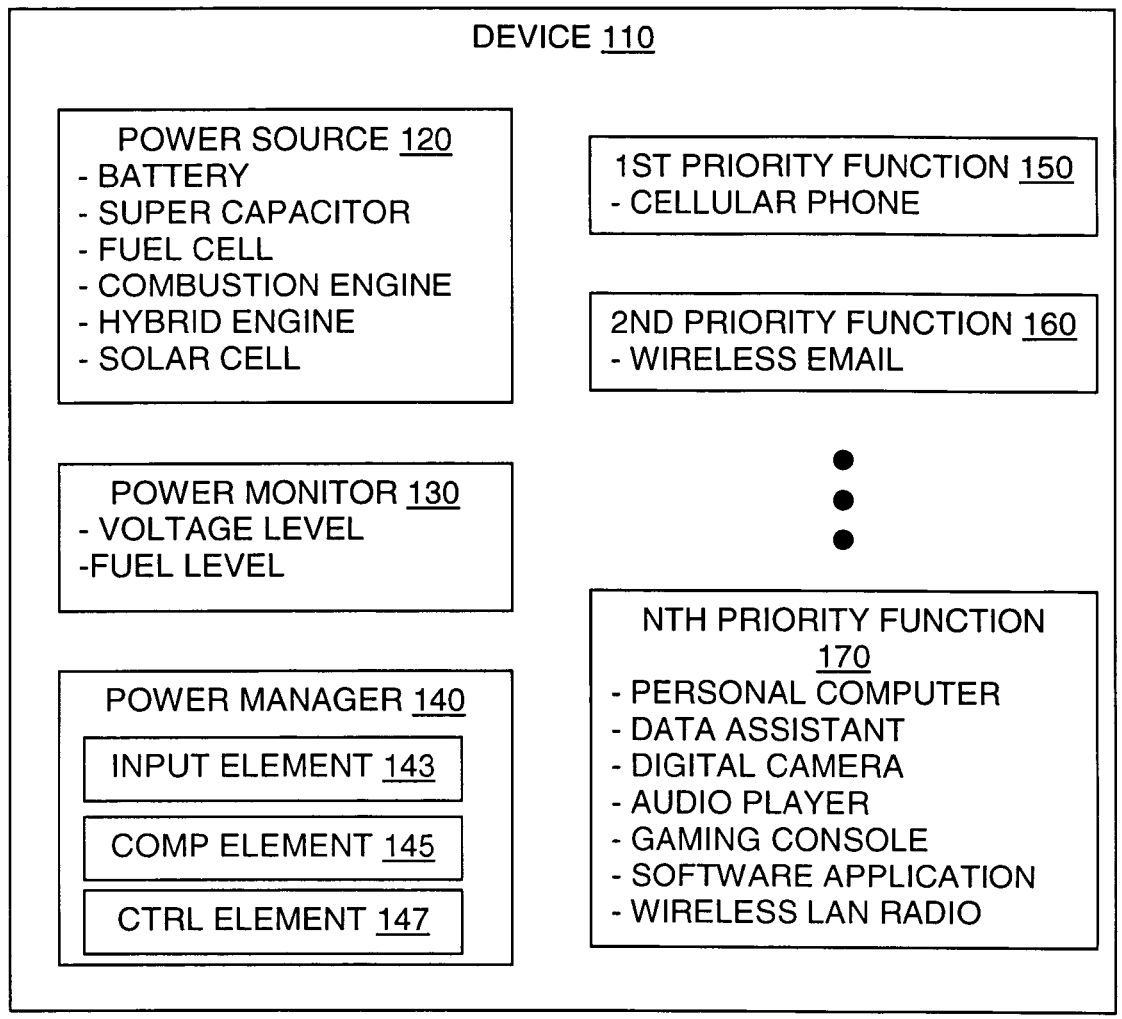
FIG. 1 illustrates one embodiment of a multi-function device.

In the following description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. It is well understood by those skilled in the art that these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention can prioritize power capacity among functions in a multi-function device. By prioritizing power capacity, embodiments of the present invention can provide multiple virtual power sources using a single power source, with one virtual power source dedicated to each function or sub-set of functions. And, by virtualizing the power source, embodiments of the present invention can meet or approximate usage expectations for one or more functions provided by a multi-function device.

For example, in a device with a handheld computer function and a cell phone function, the cell phone function may have a higher priority than the computer function. In which case, an embodiment of the present invention may reserve some portion of the power capacity for the cell phone function. As the device is used, it can measure its remaining power capacity and disable the computer function when the capacity drops below the reserved level.

If the capacity reserved for the phone function is 30%, and the power source can supply the computer function by itself for 4 hours, the virtual power source for the computer function may provide about 70% of the 4 hours, or about 2.8 hours. The actual computer time will probably be less if the phone function is used at the same time.

If the power source could supply the phone function by itself for 10 hours of talk time and 250 hours of standby time, the virtual power source for the phone function may still last up to 10 hours of talk time and 250 hours of standby time because the phone function could receive 100% of the battery's capacity if the computer function is not used. If the computer function is used, the virtual battery for the phone function may provide a minimum of about 30%, or about 3 hours of talk time and about 75 hours of standby time.

In this example, neither virtual battery is likely to exactly match the performance of a battery in a single-function cell phone or a hand-held computer, but the virtual batteries can approximate the performance. That is, a user will probably expect to the computer function to last a few hours, and the user will probably expect a few days of standby time for the cell phone function. The virtual batteries can meet both of these expectations by preventing the computer function from completely depleting the power source.

Embodiments of the present invention can be implemented in a number of different ways and in a variety of different devices. FIG. 1 is a block diagram illustrating a few of the possibilities. Device 110 includes a power source 120, a power monitor 130, a power manager 140, and multiple functions 150-170. Device 110 may take virtually any form. It may be mobile or stationary. It may be a handheld device, a notebook computer, a tablet computer, or a desktop computer. It may be incorporated into a larger device, such as a vehicle or machinery.

Power source 120 can include a wide variety of sources, such as a battery, a super capacitor, a fuel cell, a combustion engine, a hybrid engine, a solar cell, or any combination thereof. The type of power monitor 130 may depend on the type of power source 120. For example, power monitor 130 may measure the voltage level of a battery or super capacitor as an indication of the remaining capacity. For a fuel cell or combustion engine, power monitor 130 may measure the fuel level in a fuel tank as an indication of the remaining capacity. For a hybrid engine, power monitor 130 may measure the voltage from a battery stack and the fuel level in a tank and combine the two measurements into an indication of remaining capacity. For a solar cell, the power monitor 130 may measure the voltage level produced by a solar array as it fluctuates with the amount of light incident on the array The functions 150-170 can include a wide variety of devices, components, features, and/or applications. For example, the functions could include a cell phone, wireless email, a personal computer, a PDA, a digital camera, an audio player, a gaming console, one or more individual software applications, a wireless local area network (LAN) radio, etc. Device 110 may include as few as two functions up to virtually any number of functions.

Power manager 140 can also take virtually any form. For example, power manager 140 could be implemented in hardware, software executed by a processor, or some combination of the two. However the power manager is implemented, the illustrated embodiment includes an input element 143, a comparison element 145, and a control element 147.

The input element 143 can receive an indication of the remaining capacity of the power source 120 from power monitor 130. The comparison element 145 can compare the indication of the remaining capacity to the priority levels associated with the functions 150-170 to see of any of the functions or groups of functions have depleted their virtual batteries. In other words, the functions 150-170 can be prioritized with respect to power so that some portion of the power capacity can be reserved for each higher level of priority. In one embodiment, the priority levels can be represented by a threshold associated with each function or group of functions. In which case, the comparison element 145 can compare the indication of the remaining capacity to the thresholds associated with each function.

In the illustrated embodiment, the first priority function 150 is a cell phone, the second priority function 160 is wireless email, and the lowest priority functions 170 are grouped into a subset. In this example, the group of functions in the lowest priority may have the highest threshold, such as 50%. Wireless email may have a lower threshold, such as 35%. The cell phone may have the lowest threshold, such as 25%. Other embodiments may use any number of priority levels from two up to N, may assign any function to any priority level and/or group the functions into priority subsets any number of ways, may represent the thresholds separating priority levels in any number of ways, and may only compare the thresholds of active functions.

If the comparison element 145 identifies any functions or groups of functions that have depleted their virtual batteries, the control element 147 can initiate power control actions for those functions. Power control actions can take any number of forms to reduce the power state of a function, including immediately cutting power to a function, incrementally reducing power to the function, launching some separate power control mechanism for the function, prompting a user for permission to shut down the function or temporarily exceed the threshold for the function, etc. If a function is not currently active, the power control action may be to disable the function so that it cannot be activated while the power capacity remains low.

If the power capacity is restored, for instance the battery is recharged, the fuel tank is refilled, or the sun comes out from behind the clouds, comparison element 145 can identify functions or groups of functions that can be restored. In which case control element 147 can reverse the power control actions for any functions that no longer need to be in a lower power state.

Figure 2:
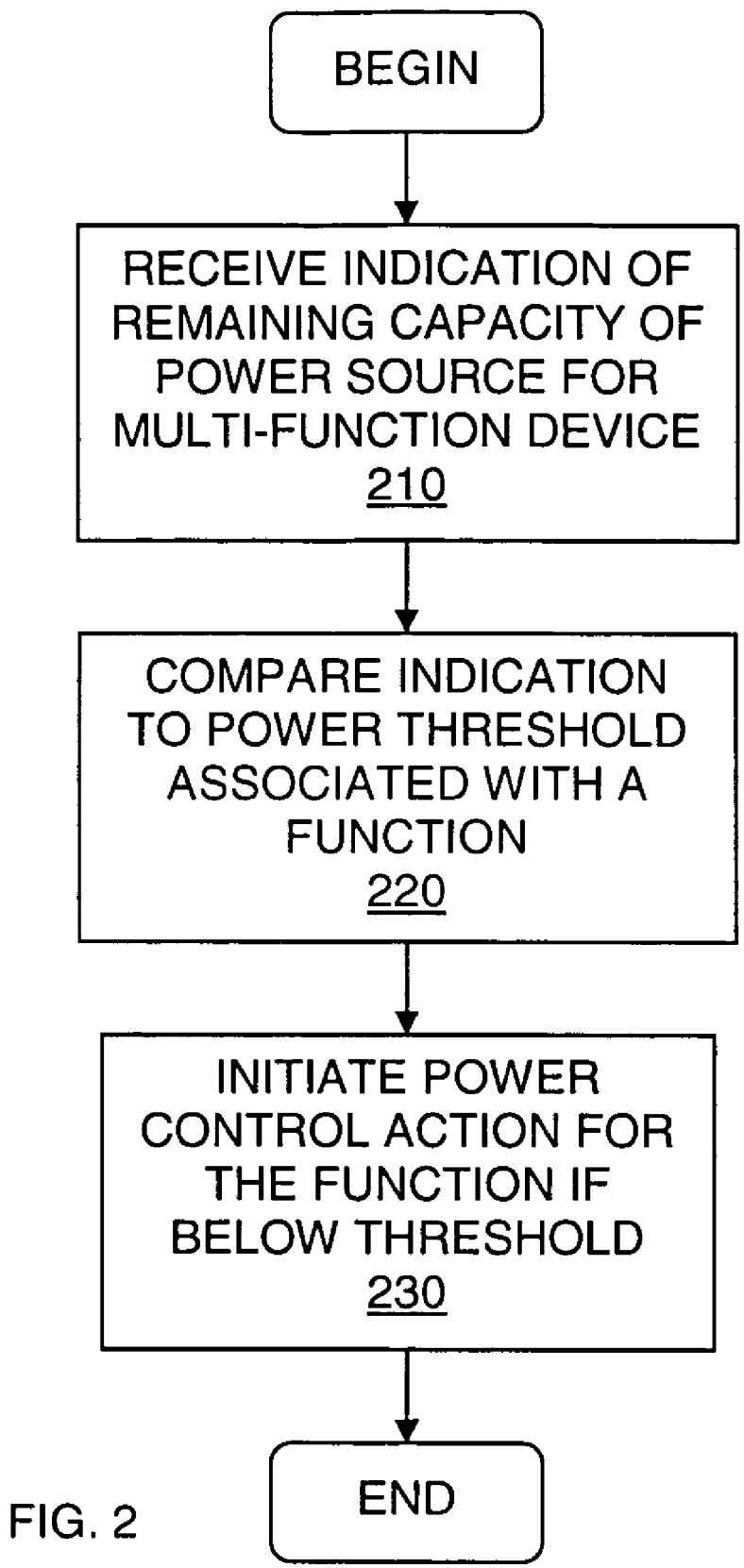
FIG. 2 illustrates one embodiment of prioritizing power between two functions.

FIGS. 2 through 5 demonstrate examples of various processes that could be performed to virtualize the power source for multiple functions within device. FIG. 2 illustrates an embodiment for a device including two functions, with one function having a higher power priority than the other.

At 210, the process can receive an indication of the remaining capacity in the power source. At 220, the process can compare the indication to a power threshold associated with the lower priority device. That is, since there are only two devices, only one threshold is really needed. The threshold for the higher priority device could be considered 0%, since the higher priority device can use 100% of the power source. At 230, the process can initiate a power control action for the function lower priority function if the indication is below the threshold.

Figure 3:
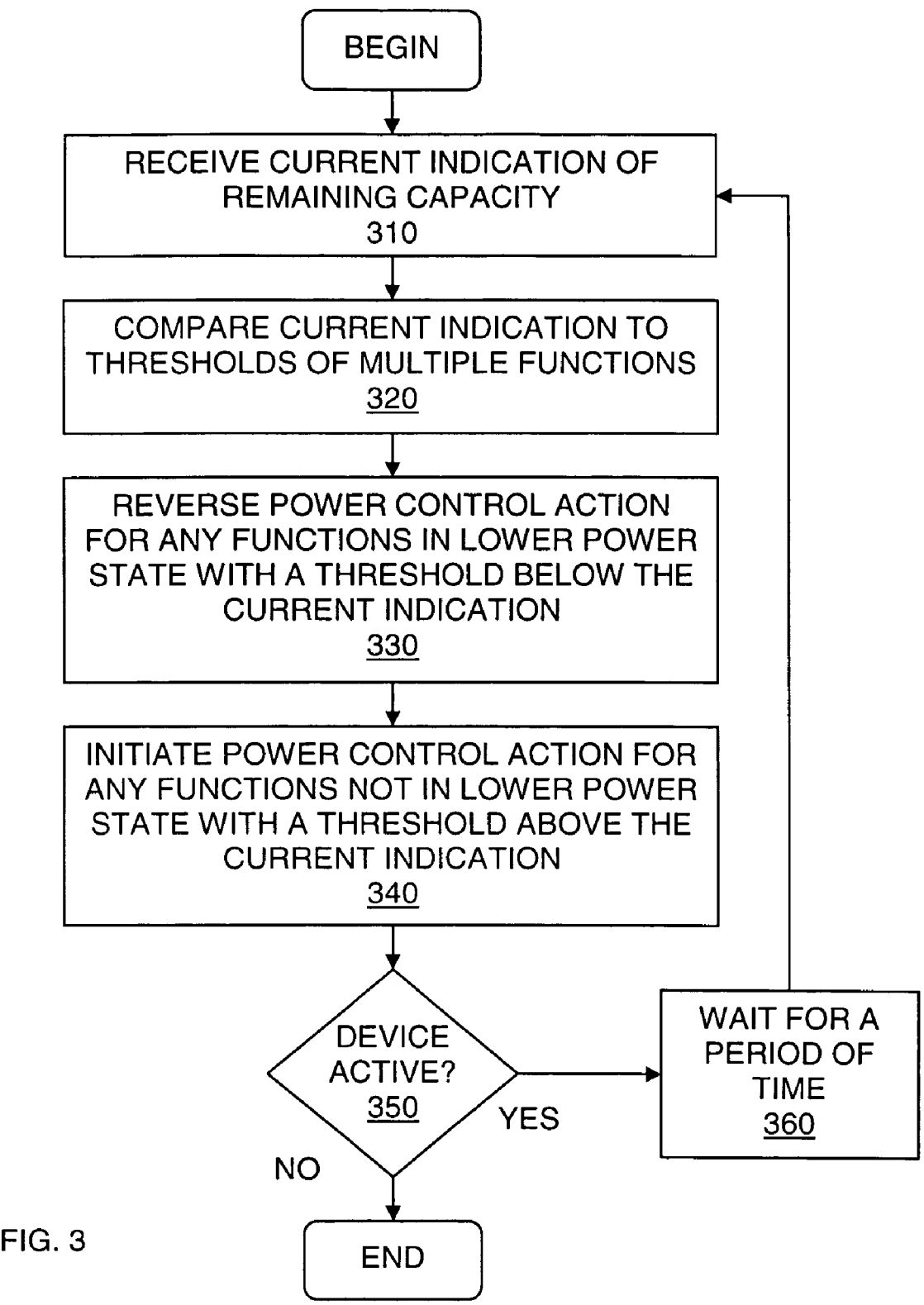
FIG. 3 illustrates one embodiment of prioritizing power among multiple functions.

FIG. 3 illustrates an embodiment for a device including more than two functions arranged into more than two priority levels. At 310, the process can receive an indication of the remaining capacity of the power source at a particular instant in time. At 320, the process can compare the current indication of the remaining capacity to the thresholds of at least the lower level functions.

If no functions are in a lower power state, the process may take no action at 330. However, if one or more functions are in a lower power state, and the power source is being replenished, one or more of the functions may be able move to a higher power state. That is, at 330, the process can reverse the power control action for any functions in a lower power state that have a threshold below the current indication of capacity.

If the capacity is going down, at 340, the process can initiate a power control action for any functions that are not already in a lower power state and that have a threshold above the current indication.

At 350, while the device remains active, the process can wait for a period of time at 360, and then loop back to 310. In other words, the illustrated example can periodically monitor the power indication and initiate and reverse power control actions accordingly.

Figure 4:
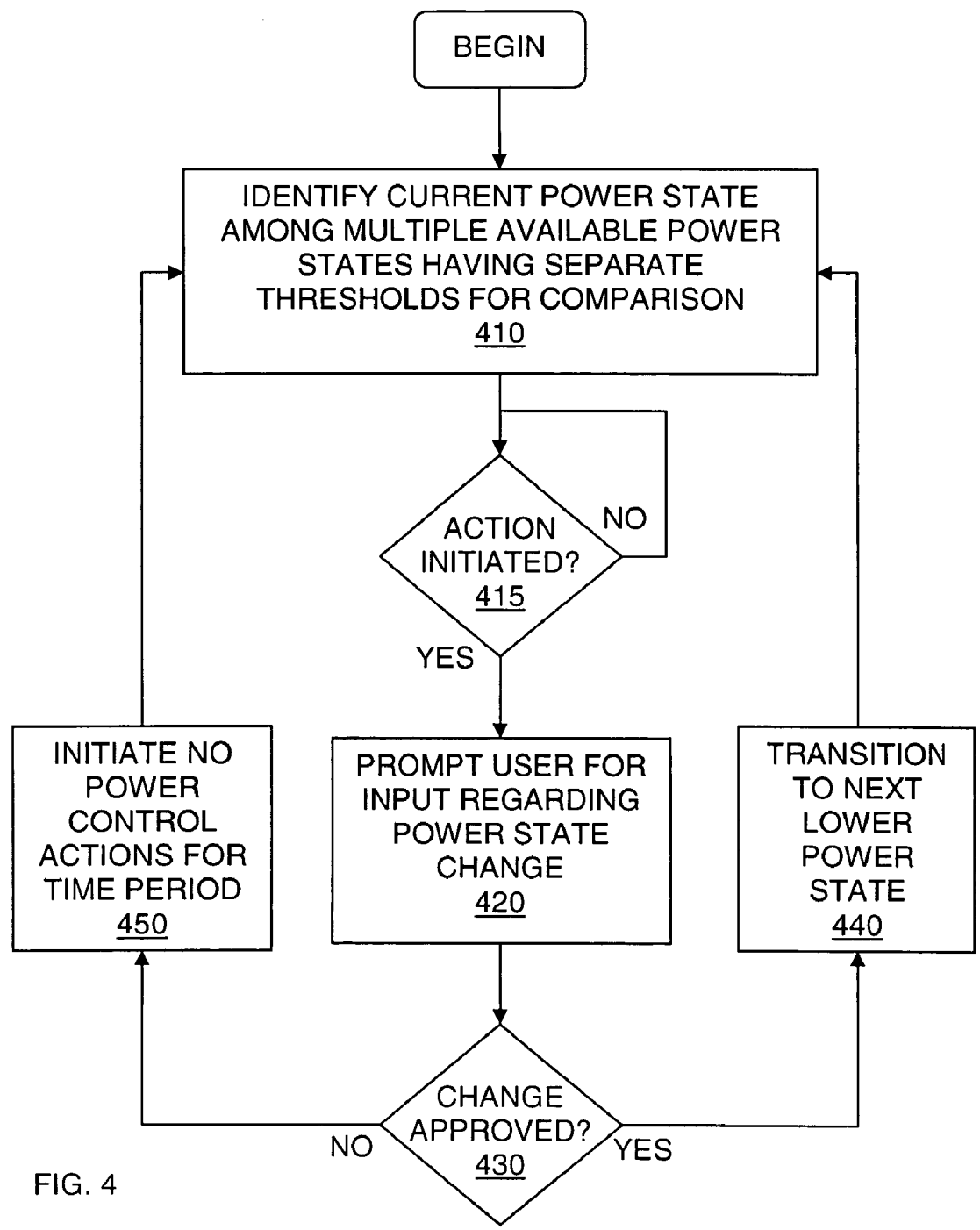
FIG. 4 illustrates one embodiment of initiating a power control action.

FIG. 4 illustrates an embodiment of initiating a power control action for a function that has multiple power states. In other words, a function can have multiple thresholds, and the threshold used for comparison with the power capacity indication can depend on the current power state of the function. For example, the function could be a display, and the display could incrementally transition through dimmer and less power consuming states as the power source capacity drops. As another example, the function could be a digital camera, and the digital camera could incrementally change to lower resolution and less power consuming pictures as the power source capacity drops.

At 410, the process can identify the current power state of the function among multiple available power states. Each power state may have a different threshold for comparison to the power capacity indication. At 415, the process waits for a power control action to be initiated based on the appropriate threshold.

In the illustrated embodiment, the power control action involves prompting a user at 420 for input regarding a power state change. For example, the process could prompt the user to approve dimming the display or reducing the picture resolution to save power. If the user approves the change at 430, the process can transition to the next lower power state at 440 and return to 410. If the user does not approve the change at 430, the process can prevent any additional power control actions to initiate at 450 for a period of time before returning to 410.

In alternate embodiments, rather than prompting the user, the power control action could take any number of forms. The power control action, like the threshold, could also be based on the current power state. For example, at first power control action may simply inform the user a function is active and is consuming power, a second power control action may inform the user that the function will shut down in 30 seconds unless overridden by the user, and a third power control action may immediate shut down the function.

Figure 5:
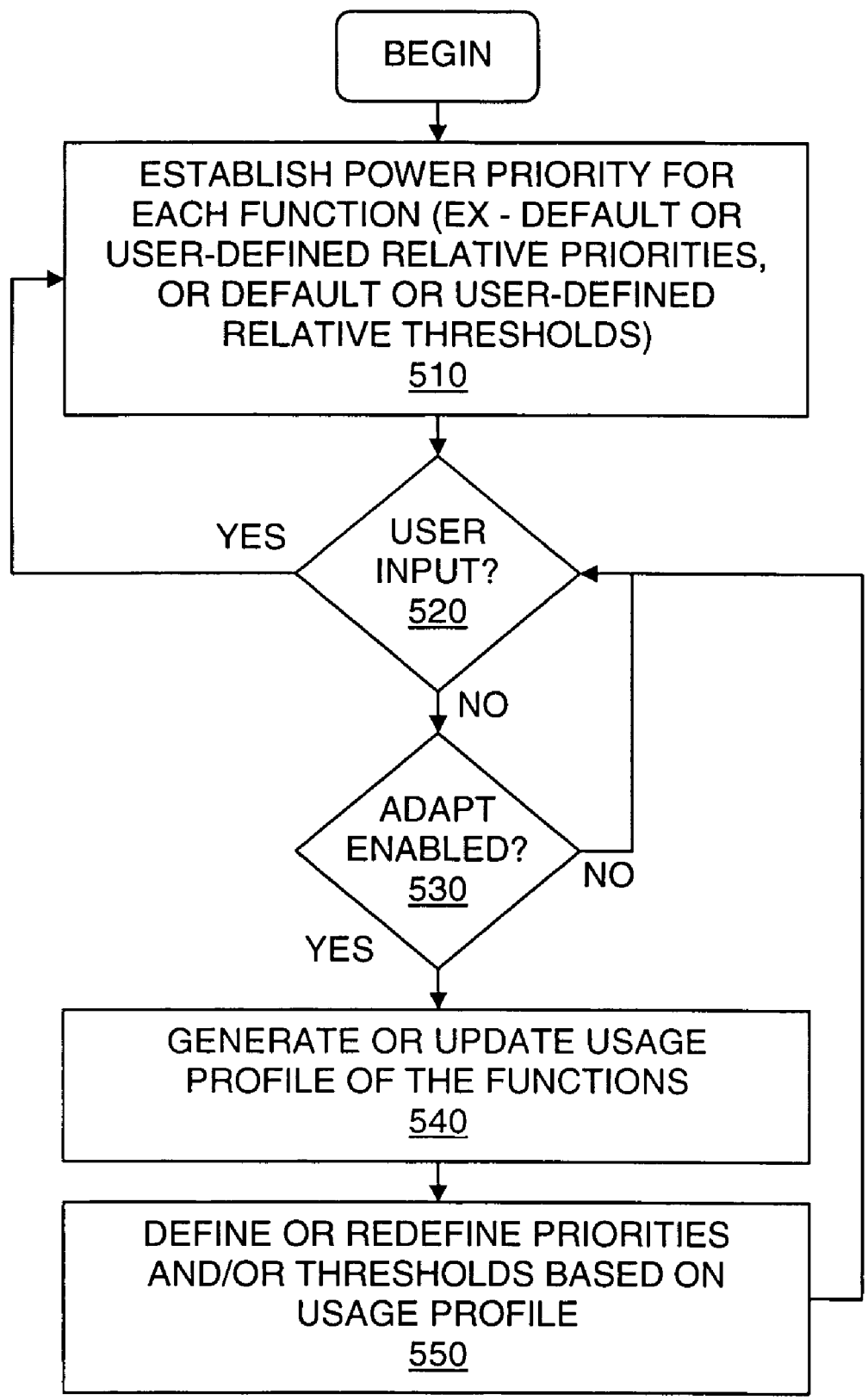
FIG. 5 illustrates one embodiment of setting priority levels and/or threshold levels for functions.

FIG. 5 illustrates an embodiment of how priority levels and thresholds can be determined. In some devices, the priority levels for the functions and the thresholds for power control actions can be fixed. In other embodiments, users may have to option to adjust priority levels and/or thresholds. In still other embodiments, priority levels and/or thresholds can be automatically adjusted by the device itself.

The priority of functions can be defined in any number of ways. For example, priority could be based on threshold levels. That is, each function could be assigned a threshold, with the higher priority functions defined thresholds that make a larger portion of the power source available. In another example, priority levels could be established separately, and then the threshold for a given function could be anywhere within a range that does not go beyond the thresholds of higher or lower priority functions. In yet another example, priority levels could attach to subsets of functions, and a threshold could be assigned to each priority level, indirectly associating the threshold with each function in the respective subset.

In FIG. 5, at 510, the process can establish power priority for each function. This could include default or user-fined priority levels and/or thresholds. At 520, the process can check for additional user input and loop back to 510 with any changes. If there is not additional user input at 520, the process can check to see if automatic adaptation is enabled at 530. If adaptation is not enable at 530, process can loop back to wait for additional user input at 520. If adaptation, is enabled at 530, the process can generate a usage profile for the functions at 540.

The usage profile could take any number of forms. In one embodiment, the user profile could track which functions are used, how often, and how long. The usage profile could also track how functions are used and how often power control actions are manually overridden for particular functions.

Then, at 550, the process can define or redefine priorities and/or thresholds based on the usage model. As long as adaptation is enabled at 530, the process can continue to track usage and redefine priorities and/or thresholds at 540 and 550.

For example, a function A may initially have the highest priority and a threshold of 0%, a function B may initially have a medium priority and a threshold of 30%, and a function C may initially have a lowest priority and a threshold of 50%. Over time the usage model may show that A and C are used most often, and B is used only rarely. The process of FIG. 5 may adjust C's threshold down over time to allot more power capacity to C, and B's threshold up to allot less power capacity to B. Eventually, B may replace C as the lowest priority.

As another example, if the usage model showed that a user routinely overrode a power control action on function B, the process of FIG. 5 may adjust B's threshold down over time to allot more power to B.

FIGS. 1-5 illustrate a number of implementation specific details. Other embodiments may not include all the illustrated elements, may arrange the elements differently, may combine one or more of the elements, may include additional elements, and the like.

Figure 6:
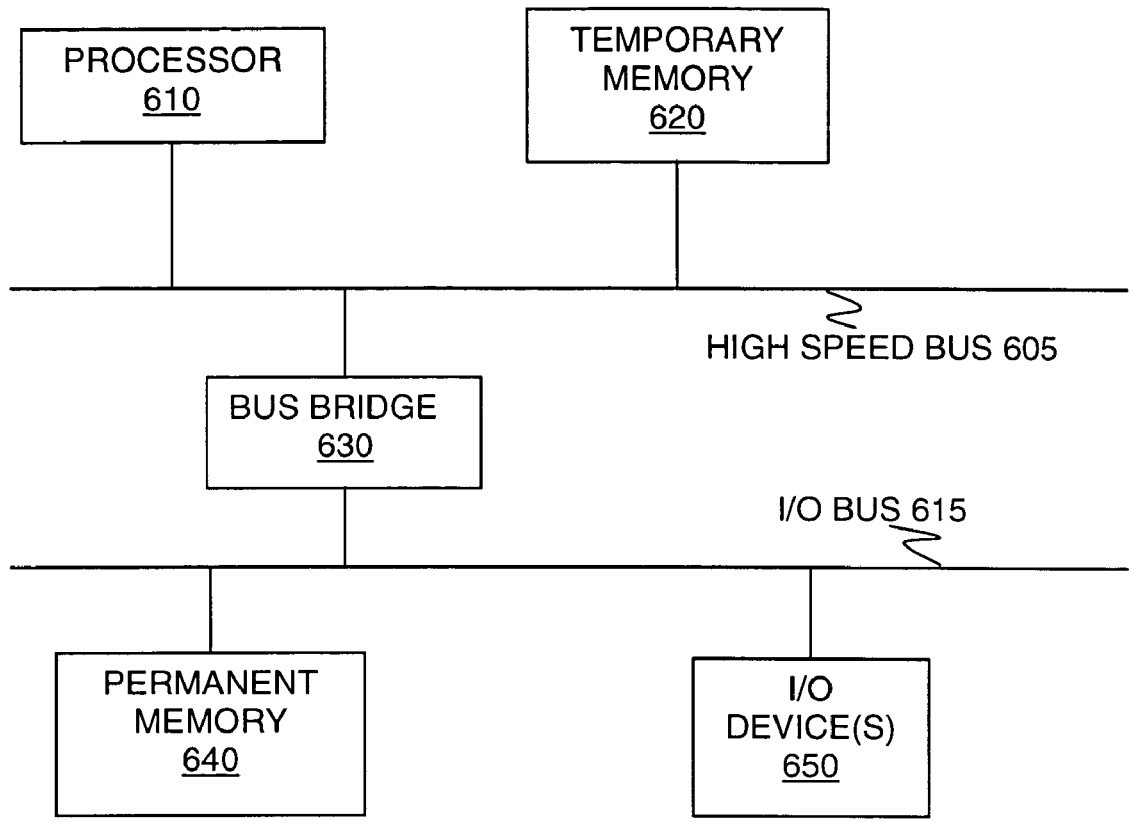
FIG. 6 illustrates one embodiment of a hardware system that can perform various functions of the present invention.

FIG. 6 illustrates one embodiment of a generic hardware system that can bring together the functions of various embodiments of the present invention. In the illustrated embodiment, the hardware system includes processor 610 coupled to high speed bus 605, which is coupled to input/output (I/O) bus 615 through bus bridge 630. Temporary memory 620 is coupled to bus 605. Permanent memory 640 is coupled to bus 615. I/O device(s) 650 is also coupled to bus 615. I/O device(s) 650 may include a display device, a keyboard, one or more external network interfaces, etc.

Certain embodiments may include additional components, may not require all of the above components, or may combine one or more components. For instance, temporary memory 620 may be on-chip with processor 610. Alternately, permanent memory 640 may be eliminated and temporary memory 620 may be replaced with an electrically erasable programmable read only memory (EEPROM), wherein software routines are executed in place from the EEPROM. Some implementations may employ a single bus, to which all of the components are coupled, while other implementations may include one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

Figure 7:
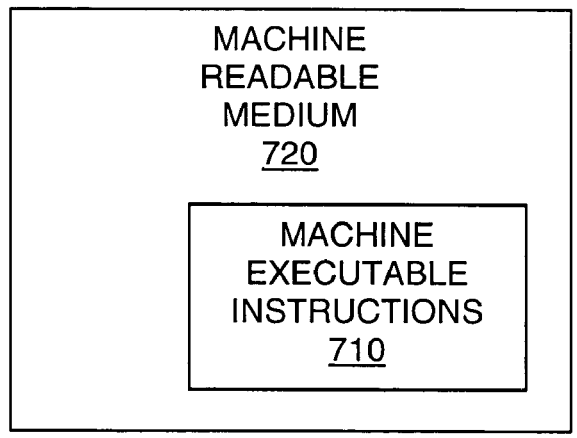
FIG. 7 illustrates one embodiment of a machine readable medium to store instructions that can implement various functions of the present invention.

Various functions of the present invention, as described above, can be implemented using one or more of these hardware systems. In one embodiment, the functions may be implemented as instructions or routines that can be executed by one or more execution units, such as processor 610, within the hardware system(s). As shown in FIG. 7, these machine executable instructions 710 can be stored using any machine readable storage medium 720, including internal memory, such as memories 620 and 640 in FIG. 6, as well as various external or remote memories, such as a hard drive, diskette, CD-ROM, magnetic tape, digital video or versatile disk (DVD), laser disk, Flash memory, a server on a network, etc. In one implementation, these software routines can be written in the C programming language. It is to be appreciated, however, that these routines may be implemented in any of a wide variety of programming languages.

In alternate embodiments, various functions of the present invention may be implemented in discrete hardware or firmware. For example, one or more application specific integrated circuits (ASICs) could be programmed with one or more of the above described functions. In another example, one or more functions of the present invention could be implemented in one or more ASICs on additional circuit boards and the circuit boards could be inserted into the computer(s) described above. In another example, one or more programmable gate arrays (PGAs) could be used to implement one or more functions of the present invention. In yet another example, a combination of hardware and software could be used to implement one or more functions of the present invention.

Thus, prioritizing available power among functions in a multi-function device is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:

maintaining a usage profile that represents a relative usage of each function among a plurality of functions in a multifunction device;

re-assigning priorities among the plurality of functions based on changes to the usage profile, said priorities defining a portion of battery capacity that is reserved for each of the plurality of functions;

determining a minimum threshold of reserved battery capacity associated with a lowest priority function among the plurality of functions based on the prioritization;

monitoring an indication of a remaining battery capacity for the multifunction device;

comparing the indication of the remaining battery capacity to the minimum threshold of reserved battery capacity associated with the lowest priority function; and if the indication of the remaining battery capacity falls below the minimum threshold of reserved battery capacity associated with the lowest priority function, disabling the lowest priority function, wherein maintaining the usage profile comprises at least one of tracking which of the plurality of functions are used, tracking how often each of the plurality of functions are used, tracking how long each of the plurality of functions are used, tracking how much oower each of the plurality of functions uses, and tracking whether and how often a user manually overrides a power control action for each of the plurality of functions.

2. The method of claim 1 further comprising:

determining a next threshold of remaining battery capacity associated with a next lower priority function among the plurality of functions;

comparing the indication of the remaining battery capacity to the next threshold of remaining battery capacity associated with the next lower priority function; and if the indication of the remaining battery capacity falls below the next threshold of reserved battery capacity, disabling the next lower priority function.

3. The method of claim 1 further comprising:

waiting for a period of time;

comparing a current indication to the minimum threshold;

if the lowest priority function is disabled and the current indication is above the minimum threshold, enabling the lowest priority function; and if the lowest priority function is not already disabled and the current indication is below the minimum threshold, disabling the lowest priority function.

4. A machine readable medium having stored thereon machine executable instructions that, when executed, implement a method comprising:

maintaining a usage profile that represents a relative usage of each function among a plurality of functions in a multifunction device;

re-assigning priorities among the plurality of functions based on changes to the usage profile, said priorities defining a portion of battery capacity that is reserved for each of the plurality of functions;

determining a minimum threshold of reserved battery capacity associated with a lowest priority function among the plurality of functions based on the prioritization;

monitoring an indication of a remaining battery capacity for the multifunction device;

comparing the indication of the remaining battery capacity to the minimum threshold of reserved battery capacity associated with the lowest priority function; and if the indication of the remaining battery capacity falls below the minimum threshold of reserved battery capacity associated with the lowest priority function, disabling the lowest priority function, wherein maintaining the usage profile comprises at least one of tracking which of the plurality of functions are used, tracking how often each of the plurality of functions are used, tracking how long each of the plurality of functions are used, tracking how much power each of the plurality of functions uses, and tracking whether and how often a user manually overrides a power control action for each of the plurality of functions.

5. The machine readable medium of claim 4, the method further comprising:
- determining a next threshold of remaining battery capacity associated with a next lower priority function among the plurality of functions;
- comparing the indication of the remaining battery capacity to the next threshold of remaining battery capacity associated with the next lower priority function; and
- if the indication of the remaining battery capacity falls below the next threshold of reserved battery capacity, disabling the next lower priority function.

6. The machine readable medium of claim 4, the method further comprising:
- waiting for a period of time;
- comparing a current indication to the minimum threshold;
- if the lowest priority function is disabled and the current indication is above the minimum threshold, enabling the lowest priority function; and
- if the lowest priority function is not already disabled and the current indication is below the minimum threshold, disabling the lowest priority function.

7. A method comprising:
- maintaining a usage profile that represents a relative usage of each function among a plurality of functions in a multifunction device;
- re-assigning priorities among the plurality of functions based on changes to the usage profile, said priorities defining a portion of battery capacity that is reserved for each of the plurality of functions;
- determining a minimum threshold of reserved battery capacity associated with a lowest priority function among the plurality of functions based on the prioritization;
- monitoring an indication of a remaining battery capacity for the multifunction device;
- comparing the indication of the remaining battery capacity to the minimum threshold of reserved battery capacity associated with the lowest priority function; and
- if the indication of the remaining battery capacity falls below the minimum threshold of reserved battery capacity associated with the lowest priority function, disabling the lowest priority function;
- wherein re-assigning priorities among the plurality of functions comprises
- adjusting the minimum threshold of reserved battery capacity associated with a particular function down over time if the usage profile indicates the particular function is being used more relative to other functions; and
- adjusting the minimum threshold of reserved battery capacity associated with the particular function up over time if the usage profile indicates the particular function is being used less relative to the other functions.

8. The method of claim 7 further comprising:
- determining a next threshold of remaining battery capacity associated with a next lower priority function among the plurality of functions;
- comparing the indication of the remaining battery capacity to the next threshold of remaining battery capacity associated with the next lower priority function; and
- if the indication of the remaining battery capacity falls below the next threshold of reserved battery capacity, disabling the next lower priority function.

9. The method of claim 7 further comprising:
- waiting for a period of time;
- comparing a current indication to the minimum threshold;
- if the lowest priority function is disabled and the current indication is above the minimum threshold, enabling the lowest priority function; and
- if the lowest priority function is not already disabled and the current indication is below the minimum threshold, disabling the lowest priority function.

10. The method of claim 7, wherein maintaining the usage profile comprises at least one of:
- tracking which of the plurality of functions are used;
- tracking how often each of the plurality of functions are used;
- tracking how long each of the plurality of functions are used;
- tracking how much power each of the plurality of functions uses; and
- tracking whether and how often a user manually overrides a power control action for each of the plurality of functions.

11. A machine readable medium having stored thereon machine executable instructions that, when executed, implement a method comprising:
- maintaining a usage profile that represents a relative usage of each function among a plurality of functions in a multifunction device;
- re-assigning priorities among the plurality of functions based on changes to the usage profile, said priorities defining a portion of battery capacity that is reserved for each of the plurality of functions:
- determining a minimum threshold of reserved battery capacity associated with a lowest priority function among the plurality of functions based on the prioritization;
- monitoring an indication of a remaining battery capacity for the multifunction device;
- comparing the indication of the remaining battery capacity to the minimum threshold of reserved battery capacity associated with the lowest priority function; and
- if the indication of the remaining battery capacity falls below the minimum threshold of reserved battery capacity associated with the lowest priority function, disabling the lowest priority function,
- wherein re-assigning priorities among the plurality of functions comprises
- adjusting the minimum threshold of reserved battery capacity associated with a particular function down over time if the usage profile indicates the particular function is being used more relative to other functions; and
- adjusting the minimum threshold of reserved battery capacity associated with the particular function up over time if the usage profile indicates the particular function is being used less relative to the other functions.

12. The machine readable medium of claim 11, the method further comprising:
- determining a next threshold of remaining battery capacity associated with a next lower priority function among the plurality of functions;
- comparing the indication of the remaining battery capacity to the next threshold of remaining battery capacity associated with the next lower priority function; and
- if the indication of the remaining battery capacity falls below the next threshold of reserved battery capacity, disabling the next lower priority function.

13. The machine readable medium of claim 11, the method further comprising:
- waiting for a period of time;
- comparing a current indication to the minimum threshold;

if the lowest priority function is disabled and the current indication is above the minimum threshold, enabling the lowest priority function; and if the lowest priority function is not already disabled and the current indication is below the minimum threshold, disabling the lowest priority function.

14. The machine readable medium of claim 11, wherein maintaining the usage profile comprises at least one of:

tracking which of the plurality of functions are used;

tracking how often each of the plurality of functions are used;

tracking how long each of the plurality of functions are used;

tracking how much power each of the plurality of functions uses; and tracking whether and how often a user manually overrides a power control action for each of the plurality of functions.

* * * * *